No. 608,093. Patented July 26, 1898.
H. WUNDERLICH.
DRAFT EQUALIZER.
(Application filed Dec. 8, 1897.)
(No Model.)
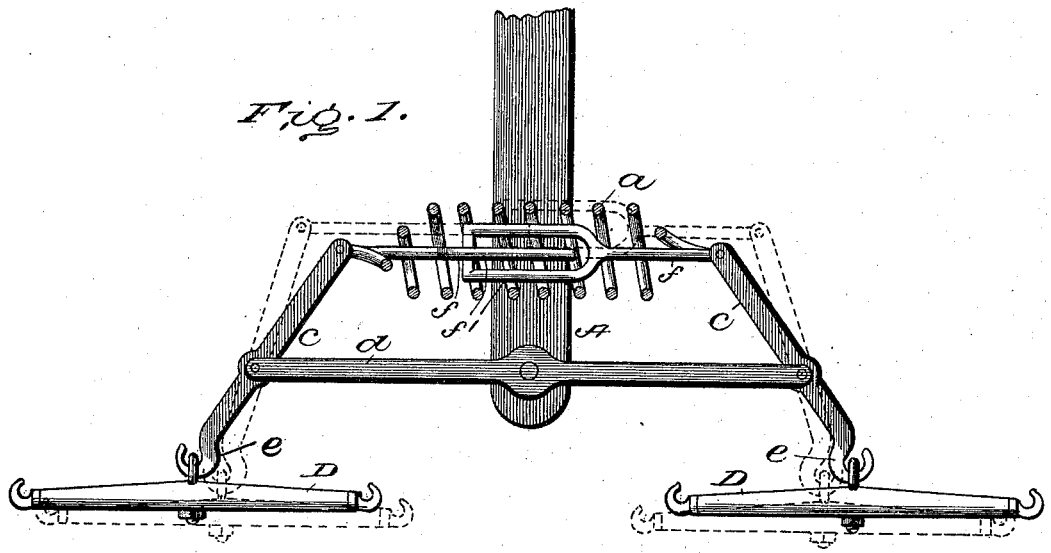
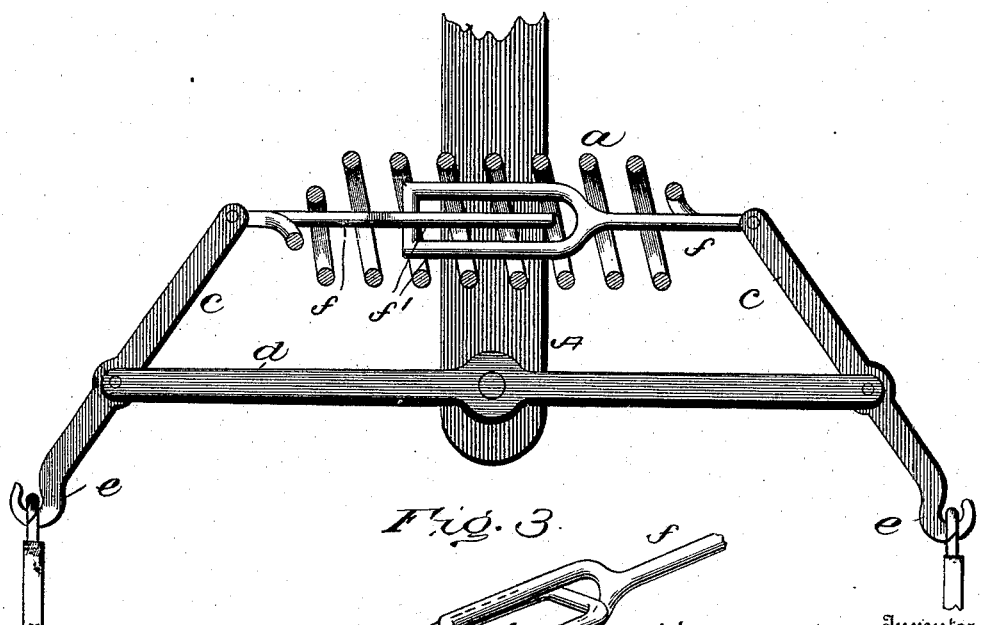
Witnesses
Inventor
Herman Wunderlich,
By Alexander & Fowle
Attorneys

UNITED STATES PATENT OFFICE.

HERMAN WUNDERLICH, OF BORNA, GERMANY, ASSIGNOR TO HERMAN LEONHARDT, OF HAMBURG, GERMANY.

DRAFT-EQUALIZER.

SPECIFICATION forming part of Letters Patent No. 608,093, dated July 26, 1898.

Application filed December 8, 1897. Serial No. 661,147. (No model.) Patented in Germany March 22, 1892, No. 65,711, and in England July 21, 1892, No. 13,396.

*To all whom it may concern:*

Be it known that I, HERMAN WUNDERLICH, a subject of the King of Saxony, residing at Borna, near Dresden, in the Empire of Germany, have invented certain new and useful Improvements in Draft-Equalizers, (for which I have obtained patents in Germany, No. 65,711, dated March 22, 1892, and in England, No. 13,396, dated July 21, 1892;) and I hereby declare that the following is a full, clear, and exact description thereof, reference being had to the accompanying drawings, which form part of this specification.

This invention relates to improved draft cushioning and equalizing devices for wagons, plows, &c., the object of which is to lessen the strain upon the animals at the starting of the vehicle and also to lessen shocks incident to the movement of the vehicle over rough roads.

In the case of two-horse vehicles the invention will equalize the draft of both animals at the starting of the load and avoid the lateral pull experienced when the horses do not start evenly or pull equally.

The invention consists in the novel construction and combination of parts hereinafter described and claimed, and, referring to the drawings—

Figure 1 is a top plan view of the device, showing the position of the parts in full lines when the draft is light and the position thereof in dotted lines when the draft is heavy. Fig. 2 is a similar view of the device adapted for a single team. Fig. 3 is a detail perspective view of the interlocking links for limiting the expansion of the spring.

Referring to said drawings, $d$ in Fig. 1 designates the doubletree or "splinter-bar," which is connected to the draft-bar A of a vehicle or otherwise suitably connected to the object to be moved. On the ends of bar A are pivoted levers $c\ c$, the rear ends of which are connected by a stout, preferably helical, spring $a$, the ends of which are pivotally connected to the rear ends of levers $c$, so as not to bind therein when the levers are oscillated. The spring is otherwise free to expand or contract. The front or outer ends of levers $c\ c$ terminate in hooks $e$, to which, as shown in Fig. 1, are attached the ordinary singletrees D, to which the traces of the harness are attached. If one horse alone is used, these singletrees D can be removed and the traces connected directly to the front ends of levers $c$, as shown in Fig. 2.

The spring $a$ tends to draw the rear ends of levers $c$ toward each other, so that their outer ends are separated, as shown in the drawings; but a forward pull on the outer end of these levers $c$ will tend to elongate the spring $a$; but if one lever is pulled more than the other the pull will be transferred through the spring and draw back the latter lever until the draft upon both levers is equalized.

It is obvious that by this construction sudden injurious shocks are prevented, the draft is eased up, the jars incident to the movement of the load are largely compensated for, the animals are not exhausted by an unyielding or continuous resistance, racking shocks are obviated, and, furthermore, the draft strain upon the levers $c$ is measurably equalized, because if one singletree D is pulled harder than the other it is drawn forward, while at the same time, through levers $c\ c$ and spring $a$, the other tree D is pulled backward by the normal tendency of the apparatus to equalize the draft strain upon both levers $c$.

To prevent spring $a$ being elongated to too great an extent, two link-rods $f$ may be pivotally connected to the ends of the levers $c$ or the ends of springs $a$, as indicated in Fig. 1, these rods $f$ having elongated interlocking loops $f'$ upon their inner ends, as indicated in the drawings, so that while they allow free elongation and contraction of spring $a$ they prevent too much elongation thereof.

Having thus described my invention, what I therefore claim as new, and desire to secure by Letters Patent thereon, is—

1. In a draft cushioning or equalizing device, the combination of a bar connected to the object to be drawn, a pair of similar levers pivoted on the ends of said bar, and a single contractile spring interposed between and having its opposite ends directly connected to the rear ends of said levers, the draft devices being applied to the outer ends of said levers, whereby the spring is elongated when draft is applied, for the purpose and substantially as described.

2. The combination of the bar $d$, the two levers pivoted respectively to the opposite ends of said bar, the spring $a$ connecting the rear ends of said levers and the two link-rods $f$ connected respectively to the rear ends of said levers and engaging the one within the other, and adapted to prevent undue elongation of the spring, all substantially as and for the purpose described.

3. The herein-described draft cushioning and equalizing device consisting of the bar $d$, the opposite levers $c, c$, pivoted on the ends thereof, the expansible and retractable spring $a$ connected at its opposite extremities to the rear ends of said levers, and the singletrees connected to the front ends of said levers, with the link-rods $f$ respectively connected to the rear end of said levers and having interlocking loops $f'$ on their inner ends and adapted to limit the expansion of the spring, all substantially as and for the purpose set forth.

In testimony that I claim the foregoing as my own I affix my signature in presence of two witnesses.

HERMAN WUNDERLICH.

Witnesses:
OTTO GÜNTHER,
HERNANDO DE SOTO.